No. 694,506. Patented Mar. 4, 1902.
J. C. WANDS.
SIDE BEARING.
(Application filed Nov. 8, 1901.)
(No Model.)

Witnesses
O. A. Phelin
George Bakewell

Inventor
John C. Wands
by Bakewell & Cornwall
Attys.

UNITED STATES PATENT OFFICE.

JOHN C. WANDS, OF ST. LOUIS, MISSOURI.

SIDE BEARING.

SPECIFICATION forming part of Letters Patent No. 694,506, dated March 4, 1902.

Application filed November 8, 1901. Serial No. 81,586. (No model.)

*To all whom it may concern:*

Be it known that I, JOHN C. WANDS, a citizen of the United States, residing at the city of St. Louis, State of Missouri, have invented a certain new and useful Improvement in Side Bearings, of which the following is a full, clear, and exact description, such as will enable others skilled in the art to which it appertains to make and use the same, reference being had to the accompanying drawings, forming part of this specification, in which—

Figure 1:
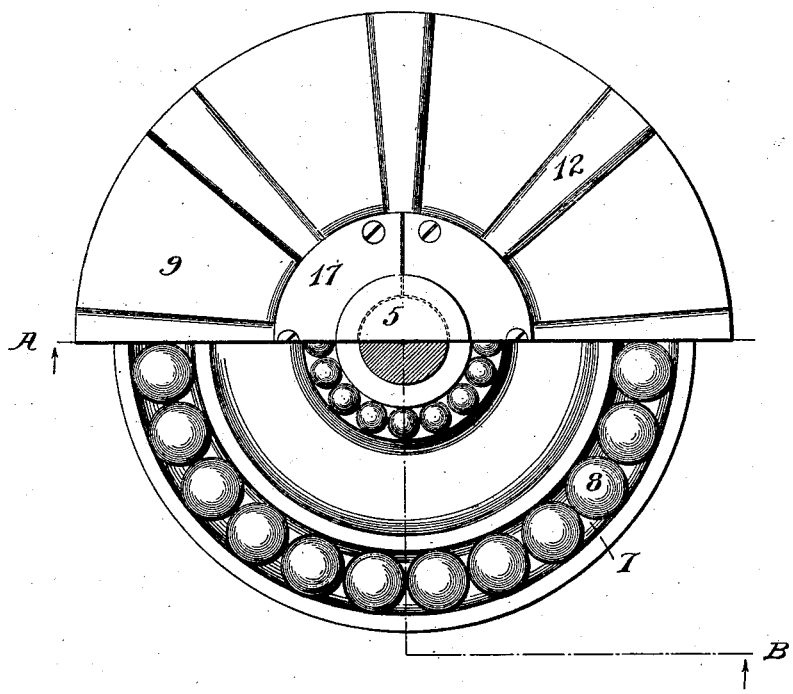
Figure 2:
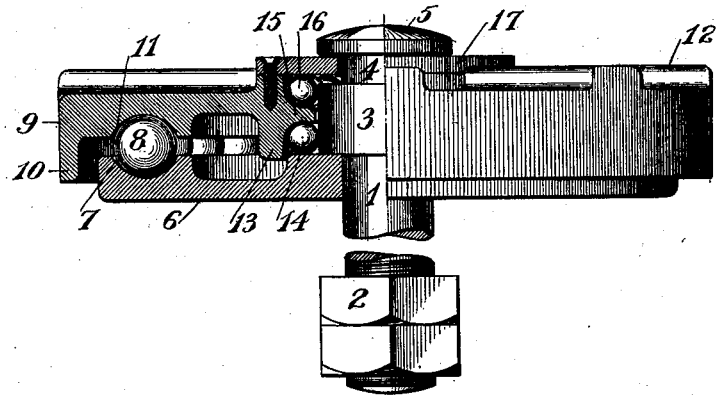

Figure 1 is a plan view of my improved side bearing, a part of the bearing-plate being removed to show the interior construction more clearly; and Fig. 2 is a side elevational view, partly in section.

This invention relates to a new and useful improvement in side bearings for railway-cars, the object being to provide a bearing of the character described which in operation is designed to rotate, the top bearing contacting with the lower bearing at one side of its axis of rotation, whereby the wear on the rotatory bearing-plate is reduced to a minimum.

Another object of my invention is to provide means located in the plane of the side thrust to take up said side thrust with the least possible friction, so as to relieve the burden-bearing balls of this action.

Another object is to utilize the spindle as the attaching medium of the bearing.

With these objects in view my invention consists in the construction, arrangement, and combination of the several parts of my invention, all as will hereinafter be described, and afterward pointed out in the claims.

In the drawings, 1 indicates a rod having its lower end preferably threaded for the reception of nuts 2. The upper end of this rod is provided with an enlargement 3, a reduced annulus 4, and a head 5.

6 indicates the base-plate in the form of a washer strung on the rod 1 and shouldered against the enlarged head 3. This washer 6 is preferably loosely mounted in position and is provided near its outer edge with a continuous curved groove 7, forming a ball-race, in which are arranged balls 8. The hub portion of this washer 6 also forms a ball-support, as will hereinafter be described.

9 indicates a rotatable bearing-plate provided with a downturned flange 10 at its outer edge, encircling the washer 6. The purpose of this flange is to prevent as far as possible the entrance of dust and dirt into the ball-races. The under surface of this rotating bearing-plate is provided with a continuous groove 11, forming a ball-race for coöperating with the balls 8. The upper face of bearing-plate 9 is formed with radial ribs or projections 12, designed to contact with the top bearing on the body-transom and reduce said contact and the friction resulting therefrom to a minimum. The central portion of this rotary element 9 is formed with a downwardly-extending flange 13 for coöperating with balls 14, said balls resting upon the hub of the washer 6 and bearing against the enlarged head 3 of the axle or spindle.

15 indicates an inwardly-extending flange, upon which are supported balls 16, said balls also bearing against the enlarged head 3.

17 indicates a flange-ring, preferably divided, as shown in Fig. 1, so that it may be introduced in position under the head 5, and the sections of said plate being secured in position by appropriate screws.

In operation the balls 8 are relied upon principally to carry the burden; but in this respect it will be noted that the lower row of balls 14 at the center of the device also assist in carrying the burden to some extent. However, the rows of balls 14 and 16 are not relied upon for this purpose, but to relieve the burden-bearing balls of the side thrusts imparted by the swaying or lunging of the car-body from side to side. The part 6, which I have designated as a "washer," is designed under normal conditions to rest upon the upper face of the truck-bolster and to remain stationary in such position. However, it is capable of movement, and in the event that the burden-bearing balls break washer 6 might be induced to rotate with the bearing-plate, especially if the bearing was mounted on a metal truck-bolster.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. In a side bearing for cars, the combination with a movable element, and ribs on the face thereof for reducing the contact of the companion bearing; substantially as described.

2. In a side bearing for cars, the combination with a rotary bearing-plate having ribs on its face, and an antifriction device coöperating with said bearing-plate; substantially as described.

3. In a side bearing for cars, the combination with a rotary element, of burden-bearing balls supporting the same, and a movable bottom ball-race in which said balls are arranged; substantially as described.

4. In a side bearing for cars, the combination with a rotary bearing-plate having radial ribs upon its face, and balls supporting said bearing-plate; substantially as described.

5. In a side bearing for cars, the combination with a rotary bearing-plate having a flat contact-face, the under face of said bearing-plate being grooved to afford an apex bearing upon a concentric row of balls, a movable lower ball-race, and balls; substantially as described.

6. In a side bearing for cars, the combination with a rotary bearing-plate, of several concentric series of balls for supporting the same, one of said series of balls taking up the side thrust; substantially as described.

7. In a side bearing for cars, the combination with a rotary bearing-plate, of a movable washer thereunder, and two concentric series of balls bearing upon said washer for supporting the bearing-plate; substantially as described.

8. In a side bearing for cars, the combination with a rotary bearing-plate, of a spindle therefor, burden-bearing balls arranged in a concentric row for supporting the outer edge of said bearing-plate, and a series of balls for supporting the center of the bearing-plate and also serving to take up the side thrust by coöperating with said spindle; substantially as described.

9. In a side bearing for cars, the combination with a shouldered spindle, of a washer loosely arranged thereon, said washer being provided with a groove forming a ball-race, a rotary bearing-plate mounted upon said spindle and supported in position by the burden-bearing balls traveling in the groove in the washer, and two concentric series of balls coöperating with the center of the bearing-plate and said spindle; substantially as described.

10. In a side bearing for cars, the combination with a spindle 1 provided with an enlargement 3, of a washer 6, a rotary bearing-plate 9, of balls 8, 14, and 16, and a flange-ring 17; substantially as described.

11. In a side bearing for cars, the combination with a spindle having enlargements 3 and 5 and a reduced annulus 4, of a washer 6 strung loosely on said spindle and having a concentric groove 7, balls 8 in said groove, a bearing-plate 9, balls 14 and 16 coöperating with said bearing-plate and with enlargement 3, and a divided flange-ring 17 fitting in the reduced annulus 4; substantially as described.

12. In a side bearing for cars, the combination with a rotary element, of a spindle therefor, said spindle also forming the attaching medium to the bolster; substantially as described.

13. In a side bearing for cars, the combination with a rod or bolt designed to be secured to a bolster and have one end project slightly thereabove, and a rotatable bearing-plate mounted on the upper projecting end of said rod; substantially as described.

14. In a side bearing for cars, the combination with a washer forming a ball-race, a bearing-plate, balls interposed between said washer and bearing-plate, a spindle forming the axis of rotation of said bearing-plate, said spindle also forming a medium for securing the parts when in position on a bolster; substantially as described.

15. In a side bearing for cars, the combination with a shouldered rod, of a washer forming a ball-race which is held in position upon the bolster by said shouldered rod, a bearing-plate rotating about the protruding end of said rod, and balls interposed between said bearing-plate and said washer; substantially as described.

In testimony whereof I hereunto affix my signature, in the presence of two witnesses, this 6th day of November, 1901.

JOHN C. WANDS.

Witnesses:
GEORGE BAKEWELL,
G. A. PENNINGTON.